United States Patent
Faber et al.

(10) Patent No.: US 12,027,339 B2
(45) Date of Patent: Jul. 2, 2024

(54) ENERGY REDUCING KEY FOR ELECTRONIC TRIP UNITS

(71) Applicant: Schneider Electric USA, Inc., Andover, MA (US)

(72) Inventors: Timothy Robert Faber, Marion, IA (US); Justin Siefkes, Swisher, IA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/234,735

(22) Filed: Aug. 16, 2023

(65) Prior Publication Data

US 2023/0395334 A1 Dec. 7, 2023

Related U.S. Application Data

(63) Continuation of application No. 17/800,343, filed as application No. PCT/US2021/023221 on Mar. 19, 2021, now Pat. No. 11,769,641.

(60) Provisional application No. 62/992,063, filed on Mar. 19, 2020.

(51) Int. Cl.
*H01H 9/28* (2006.01)
*H01H 71/04* (2006.01)

(52) U.S. Cl.
CPC ............ *H01H 9/285* (2013.01); *H01H 71/04* (2013.01)

(58) Field of Classification Search
CPC ........ H01H 9/285; H01H 71/04; H01H 71/74; H02H 3/006
USPC ........................................................ 361/114
See application file for complete search history.

(56) References Cited

U.S. PATENT DOCUMENTS

| | | | |
|---|---|---|---|
| 5,609,244 A | 3/1997 | Reiter | |
| 7,646,575 B2 | 1/2010 | Weiher et al. | |
| 8,797,720 B2 | 8/2014 | Weiher et al. | |
| 9,893,455 B1 * | 2/2018 | Brodsky | H01R 13/71 |

(Continued)

FOREIGN PATENT DOCUMENTS

| | | | | |
|---|---|---|---|---|
| WO | 2016037596 A1 | | 3/2016 | |
| WO | WO-2016037596 A1 * | | 3/2016 | ........... H01H 50/021 |

OTHER PUBLICATIONS

International Search Report and Written Opinion mailed Jul. 23, 2021 for corresponding International Application No. PCT/US2021/023221, 15 pages.

(Continued)

*Primary Examiner* — Kevin J Comber
(74) *Attorney, Agent, or Firm* — Locke Lord LLP

(57) ABSTRACT

Embodiments provide an Energy Reduction Maintenance Setting (ERMS) key that includes a data connector configured to communicatively couple to a data port of a target device. The ERMS key further includes an illumination device and an actuator mechanism having a base positional state and an actuated positional state. The ERMS key includes logic configured to, upon detecting the actuator mechanism has moved from the base positional state to the actuated positional state, generate and transmit a first data message to the target device through the data connector instructing the target device to enter a protected mode. The logic is further configured to, upon receiving a second data message from the target device over the data connector acknowledging that the target device has successfully entered the protected mode, cause the illumination device to illuminate.

17 Claims, 6 Drawing Sheets

(56) References Cited

U.S. PATENT DOCUMENTS

| | | |
|---|---|---|
| 10,211,625 B2 | 2/2019 | Sivakumar et al. |
| 2007/0097582 A1* | 5/2007 | Shipp ........................ H02H 9/00 |
| | | 361/115 |
| 2013/0063871 A1* | 3/2013 | Weiher ..................... H02H 3/00 |
| | | 361/643 |
| 2016/0087425 A1* | 3/2016 | Sivakumar ............. H02H 7/122 |
| | | 307/52 |

OTHER PUBLICATIONS

Extended European Search Report and Search Opinion dated Jan. 22, 2024 for corresponding European Patent No. EP21770975, 6 pages.

\* cited by examiner

ENERGY REDUCING KEY FOR ELECTRONIC TRIP UNITS

PRIORITY INFORMATION

The present continuation application claims the benefit of and priority to co-pending U.S. patent application Ser. No. 17/800,343, filed on Aug. 17, 2022, which claims the benefit of and priority to PCT/US2021/023221, filed on Mar. 19, 2021, which claims the benefit of and priority to U.S. Provisional Patent Application Ser. No. 62/992,063, filed Mar. 19, 2020. The disclosure of the above-identified prior U.S. Patent Applications, in their entirety, are considered as being part of the present application, and thus, are incorporated herein by reference in their entirety.

TECHNICAL FIELD

The present disclosure relates to electrical distribution equipment, and more particularly, to systems and techniques for using a key mechanism to place electrical distribution equipment in a protected arcing energy mode to ensure the safety of maintenance personnel.

BACKGROUND

Electrical equipment typically requires periodic maintenance. For instance, electrical equipment often requires cleaning, repairs, testing, and/or adjustments. Further, some electrical equipment may require replacement. Consequently, there is a need to provide service personnel with means to create a safe working environment by disconnecting electricity to the equipment which the service personnel are servicing. One way to accomplish this disconnecting of electricity is to disconnect power with a circuit breaker where contacts can be opened and the operator mechanism can be padlocked in the "open" position to prevent accidental closing of contacts. Preventing the closing of contacts would prevent re-energizing the circuit. In general, facilities with electrical equipment have a specific procedure which establishes the minimum requirements for lockout of energy sources that could cause injury to service personnel. This procedure is commonly referred to as a lockout-tagout procedure.

Circuit breakers are typically used as an integral component in a power-distribution system. Circuit breakers, in addition to providing overload current protection, can also be used as disconnect devices to de-energize downstream electrical distribution circuits as needed to perform, for example, maintenance. In some cases, however, it can occur that maintenance or access to electrical systems must be done with such systems energized and this situation can present a significant risk for injury or property damage. To address this risk, recent industry rules and practices have evolved to create a "lower energy service mode" (also referred to herein as a protected mode) that is achieved with special hardware and procedures to reduce the afore-mentioned risks. One drawback of these systems is that they typically require the permanent installation of hardware resulting in additional costs to purchase, maintain, or retrofit separately each electrical system for which the benefit of reduced risk is needed or desired.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
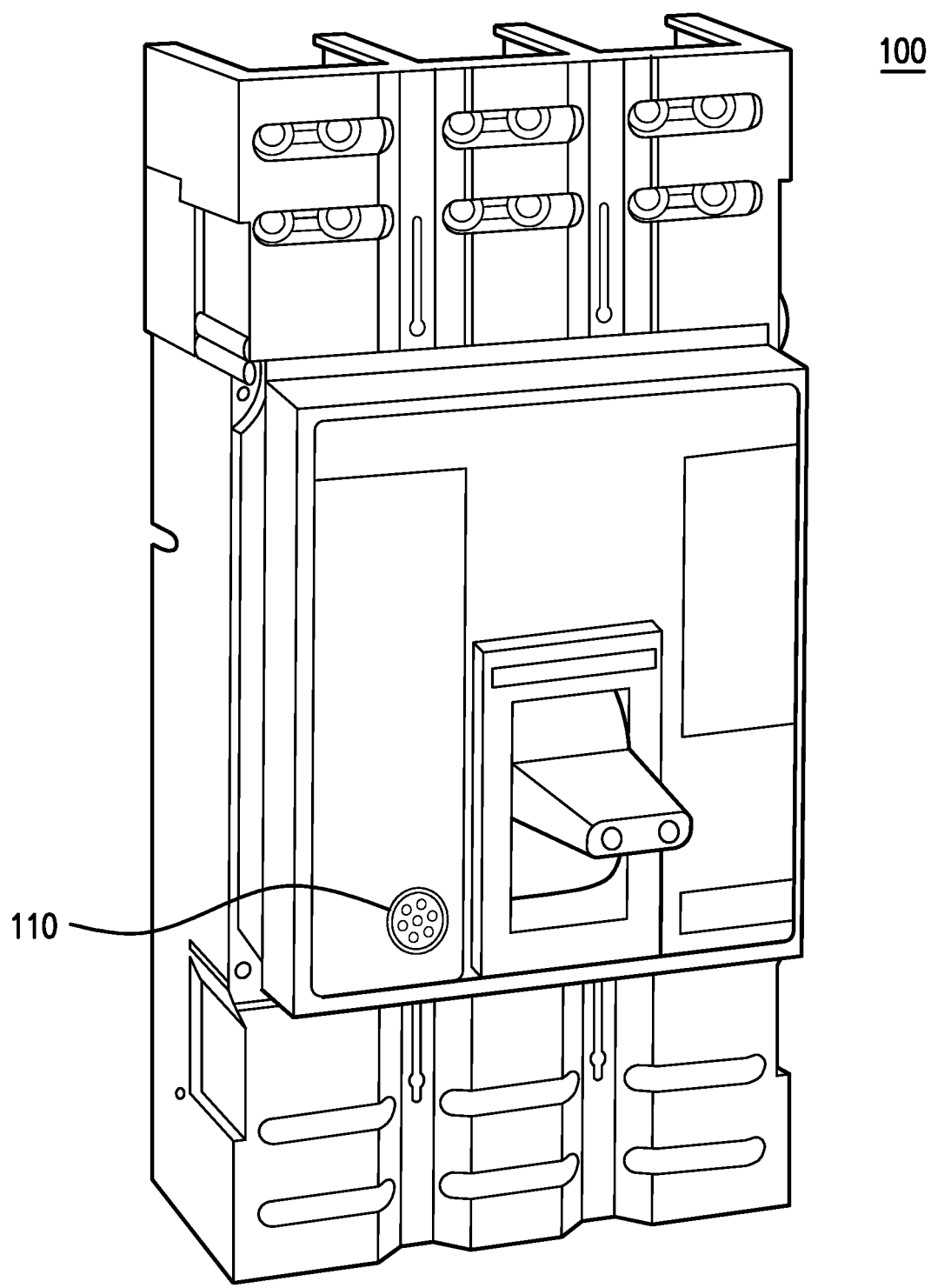
FIG. 1 illustrates a trip unit configured for use with an Energy Reduction Maintenance Setting (ERMS) key, according to one embodiment described herein.

Lockout-tagout is a safety procedure outlined by the Occupational Safety and Health Administration (OSHA). In general, lockout-tagout is used to prevent the release of hazardous energy during service, maintenance, and/or installation of industrial equipment. A typical lockout-tagout procedure involves service personnel physically taking a padlock with a unique key and identification tag and engaging the proper safety latches to disable equipment before the service personnel begin service. Each service worker on the job uses their own padlock, and the padlock is not removed until the service worker is done with service. Unique keys for each worker prevent unlocking (e.g., accidental unlocking and/or intentional unlocking) by anyone else aside from the service worker intending the equipment to be locked out.

In the switching and power industry, the main hazardous energy is electrical power. However, in some circumstances, it can be safer to work on a given piece of equipment while it is powered, as the risk of depowering the unit could be greater due to the circumstances. As such, electrical distribution equipment can provide the ability to reduce their incident energy environment. Today, the ability to reduce the incident energy environment of electrical distribution equipment is mandated by industry standards such as NFPA 70E. This mandate has required responses from all manufactures to provide this feature. For example, this functionality can be provided by configuring a trip unit or protective relay to have lower trip settings while it is in the protected mode. Some systems today include special trip unit variants, while others include special external relays and switches to provide the needed function. These systems are normally permanently attached to a specific piece of electrical equipment and are normally ordered and configured at significant cost. While it is possible to retrofit some existing systems to include such functionality, such retrofits come with a significant cost (e.g., replacing trip units, adding additional wiring and switches, etc.).

As such, embodiments described herein provide apparatuses and techniques for placing a piece of equipment in a protected mode without requiring expensive equipment replacement or retrofitting, and do so in a safe manner by enabling practices similar to "Lock Out, Tag Out" (LOTO) which is the industry standard for entering, maintaining, and exiting an "electrically safe working condition" for typical maintenance and access needs and most commonly resulting in a de-energized condition. However, in the present disclosure, a lower electrical energy condition (or a protected mode) is achieved as is needed to minimize risk and allow the electrical system to continue operating during maintenance or service.

One embodiment described herein provides an Energy Reduction Maintenance Setting (ERMS) key that can be used (e.g., by maintenance personnel) to place a target device (e.g., a trip unit of a circuit breaker, switch, etc.) into or out of a low energy mode. For example, such a device may be used as a maintenance tool and inserted into a port of the target device to place the target device in a protected (i.e., lower) arcing energy mode. In one embodiment, the ERMS key is a relatively small, portable device and is easily attached to the target device via a trip unit test port on the front of the device.

The functioning of this system could be regulated by following a practice similar to "Lock Out, Tag Out" (LOTO) which is the industry standard for entering, maintaining, and exiting an "electrically safe working condition" for typical maintenance and access needs, and most commonly resulting in a de-energized condition. However, this context, a lower electrical energy condition is achieved as is needed to minimize risk and allow the electrical system to continue to operate so while the method for entering, maintaining and exiting the maintenance modes are the same, the resulting electrical energy situation is different.

Once attached, the ERMS key can be instructed to place the trip unit into the protected mode. For example, in one embodiment, a portion of the ERMS key can be rotated from a first position to a second position, and one or more electrical contacts within the ERMS key could be configured to close when the portion of the ERMS key is rotated into the second position. In response to the contacts closing, logic within the ERMS key could transmit an instruction to the target device through the test port, instructing the target device to activate its protected mode. Upon receiving an acknowledgement from the target device over the test port, the logic within the ERMS key could provide a visual indication to users, indicating that the target device has successfully been placed in protected mode. A lockout-tagout procedure could then be employed, where users can use padlocks or other suitable locking devices to secure the ERMS key in the second position, thereby preventing the protected mode from being deactivated until the service personnel remove the padlock. As such, the ERMS key can act as part of an electrical maintenance operator's toolkit and can be used to enable the protective mode for multiple different pieces of compatible electrical equipment, without the need for permanent modification to the equipment and while respecting the established rules, practices and benefits of LOTO.

Additionally, when placing the trip unit into the protected mode, the ERMS key can give a clear visual indication of the trip unit's status (e.g., by illuminating one or more light-emitting diodes (LEDs) within the ERMS key). In one embodiment, the ERMS key is configured to provide such a visual indication only after receiving an acknowledgement from the trip unit, indicating that the trip unit has successfully been placed in protected mode. Doing so ensures that the visual indication is not provided prematurely and ensures that the equipment is in a safe state for maintenance personnel when the visual indication is provided. Moreover, such a key can be integrated into a Safe Work process (e.g., a process that mirrors or closely follows LOTO) to insure the status of the target device and control the entrance into and out of the protected state. Advantageously, such an ERMS key does not require modification of the target piece of electrical equipment, is only attached temporarily (as in during the needed maintenance operation) and can be used in any compatible trip unit.

FIG. 1 illustrates a trip unit configured for use with an ERMS key, according to one embodiment described herein. As shown, the trip unit 100 includes a data port 110. In the depicted embodiment, the data port 110 represents a round multi-pole data port. However, more generally, any suitable type of data port could be used, including (without limitation) a Universal Serial Bus (USB) data port, data ports of other shapes (e.g., a rectangular multi-pole data port) and so on.

Figure 2:
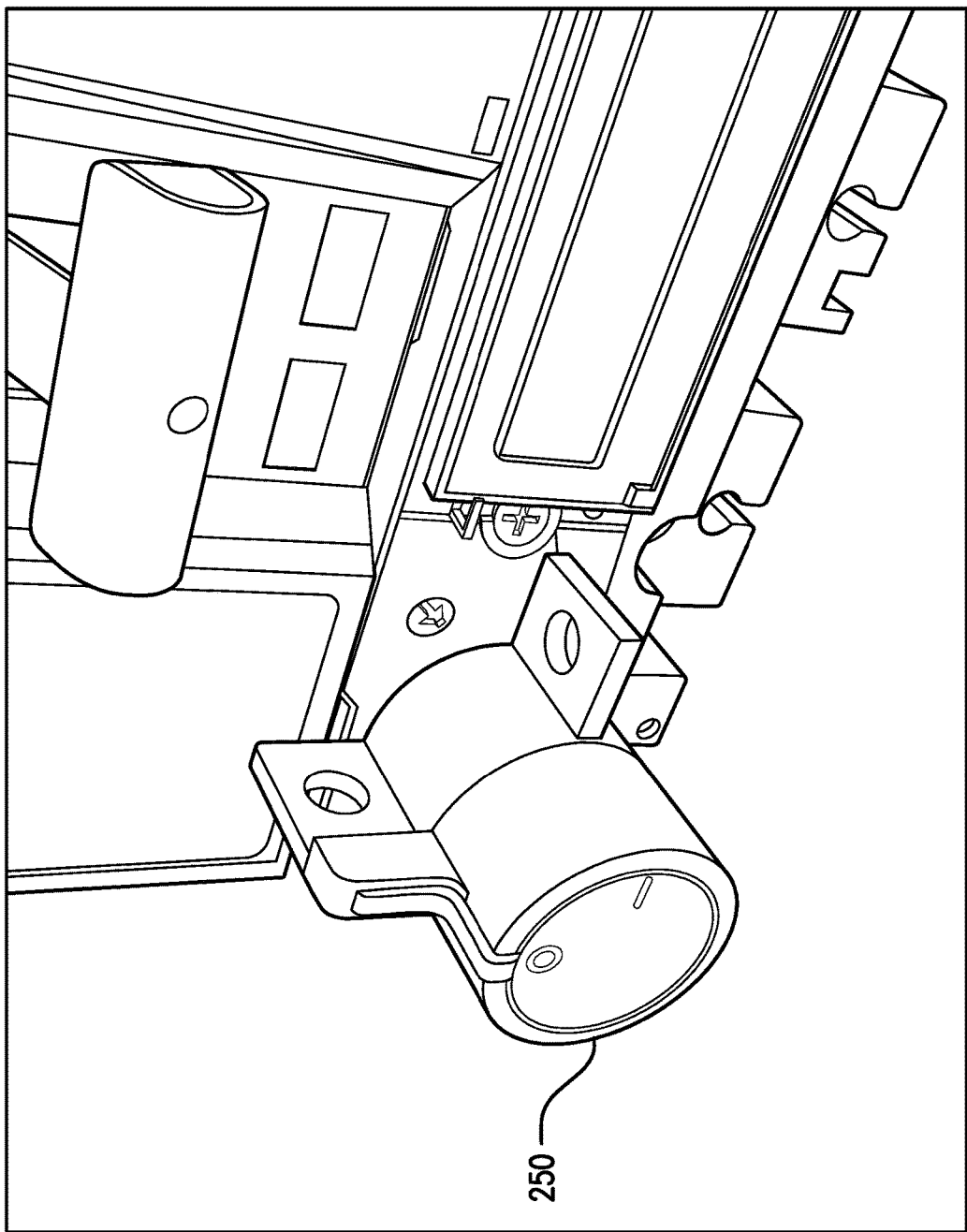
FIG. 2 illustrates an energy reduction maintenance setting key in a first position, according to one embodiment described herein.
Figure 3:
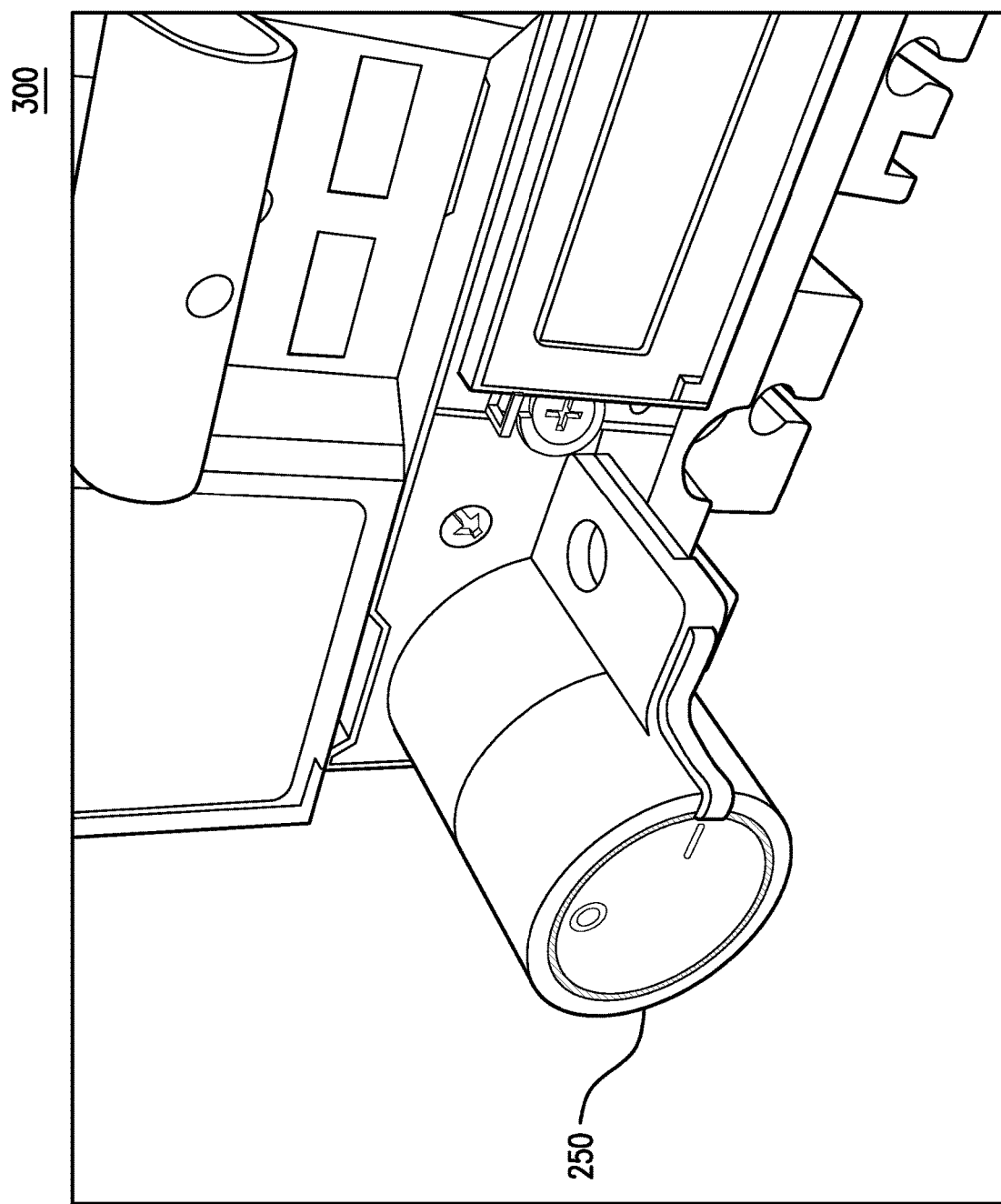
FIG. 3 illustrates an energy reduction maintenance setting key in a first position, according to one embodiment described herein.

Generally, embodiments described herein provide an ERMS key that can be inserted into the trip unit 100 and actuated in order to place the trip unit 100 into a protected operating mode. For example, a technician could insert the ERMS key into the data port 110 and could turn the ERMS key (e.g., by approximately 90 degrees) to place the ERMS key into the low energy mode position. An example of this can be seen in FIGS. 2 and 3, where FIG. 2 illustrates an ERMS key in a first position representing normal operation of the target device, and FIG. 3 illustrates the ERMS key in a second position representing the ERMS key in the low energy mode position. As can be seen in FIGS. 2 and 3, the ERMS key contains a translucent circular portion that can be illuminated by an illumination device (e.g., one or more light-emitting diodes) within the ERMS key. In one embodiment, the ERMS key is configured to illuminate to provide a confirmation when a target device is in a protected mode. Thus, in FIG. 2, the illumination device (and thus the translucent circular portion) is not illuminated, as the ERMS key is in a base position. However, in FIG. 3, the ERMS key has been rotated to the second position which is used to place the target device in the protected mode. In the depicted embodiment, logic within the ERMS key has received an acknowledgement from logic within the target device, indicating that the target device has successfully transitioned to the protected mode. In response, the logic within the ERMS key has performed an operation causing the illumination device within the ERMS key to illuminate, and thus the translucent circular portion of the ERMS key shown in FIG. 3 is illuminated.

The ERMS key may include a locking mechanism (e.g., one or more pins of one or more bayonet connectors) that can secure the ERMS key, once the ERMS key is turned to the low energy mode position. Additionally, additional security device can be used to ensure the ERMS key remains in the low energy mode position. For example, a number of different security mechanism (e.g., padlocks) can be used as part of a lockout/tagout or similar procedure, where each worker uses a separate security mechanism to secure the ERMS key in place. Doing so further ensures the safety of the workers, as each worker will need to remove his own security mechanism before the ERMS key can be disconnected and the low energy mode can be disengaged.

Figure 4:
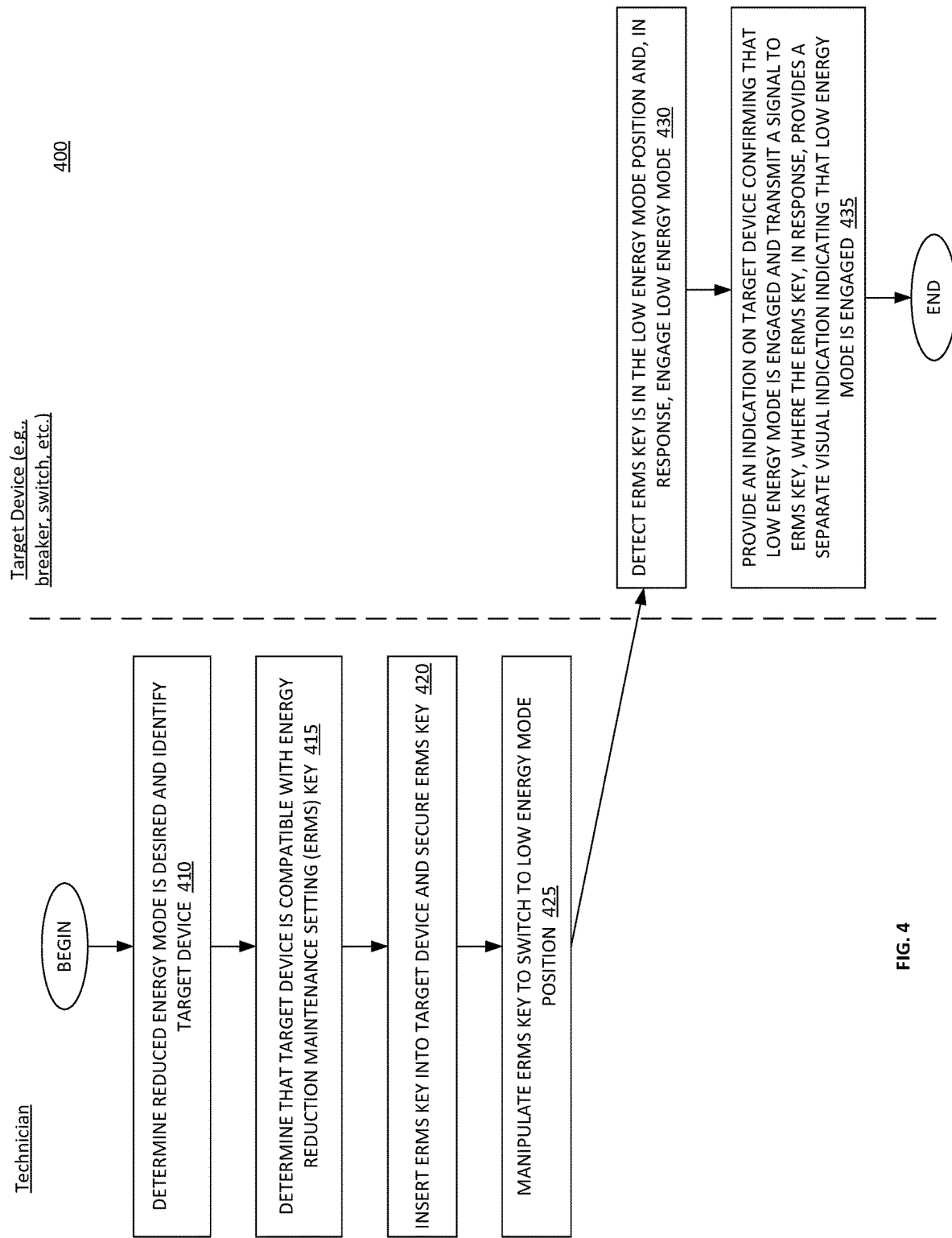
FIG. 4 is a flow diagram illustrating a method for enabling a low energy mode in a target device, according to one embodiment described herein.

FIG. 4 is a flow diagram illustrating a method for enabling a low energy mode in a target device, according to one embodiment described herein. As shown, the method 400 begins at block 410, where a maintenance technician identifies a target device and determines reduced energy mode for the target device is desired. The technician determines that the target device is compatible with an ERMS key (block 415). The technician then inserts the ERMS key into the target device and secures the ERMS key (block 420).

Generally, a number of different ways can be used to secure the ERMS key to the target device. For instance, the ERMS key could include a bayonet connector or other suitable fastening mechanism that can be inserted into a corresponding plug on the target device and then rotated to secure the connection. As an example, the ERMS key could include a male bayonet connector having one or more pins, and the target device could include a female bayonet connector having one or more slots. Once the ERMS key is rotated to a predefined position, a spring(s) could push the one or more pins into a serif (e.g., a short recess at the end of each of the one or more slots), thereby locking the ERMS key into place until the pin(s) are removed from the serif.

In the depicted example, the technician then manipulates the ERMS key to a low energy mode position (block 425). For example, the technician could turn the ERMS key (e.g., by approximately 90 degrees) to place the ERMS key into the low energy mode position. An example of this can be seen in FIGS. 2 and 3, where FIG. 2 illustrates an ERMS key in a first position representing normal operation of the target device, and FIG. 3 illustrates the ERMS key in a second position representing the ERMS key in the low energy mode position. As discussed above, the ERMS key may include a locking mechanism (e.g., one or more pins of one or more bayonet connectors) that can secure the ERMS key, once the ERMS key is turned to the low energy mode position. Additionally, additional security device can be used to ensure the ERMS key remains in the low energy mode position. For example, a number of different security mechanism (e.g., padlocks) can be used as part of a lockout/tagout-style procedure, where each worker uses a separate security mechanism to secure the ERMS key in place. Doing so further ensures the safety of the workers, as each worker will need to remove his own security mechanism before the ERMS key can be disconnected and the low energy mode can be disengaged.

In response to the ERMS key being manipulated to the low energy mode position, logic in the target device detects the ERMS key being in the low energy mode position and, in response, switches the target device to begin operating in the low energy mode (block 430). For example, logic within the ERMS key could transmit one or more data messages over the connection between the ERMS key and the target device indicating that the ERMS key has been turned into position, and logic on the target device could receive these messages and react accordingly. More generally, it is contemplated that any number of different communication schemas could be used according to various embodiments described herein, including unidirectional communications (e.g., by either the logic on the ERMS key or the logic on the target device), bidirectional communications (initiated by either the logic on the ERMS key or the logic on the target device) and so on. Could also authenticate ERMS key. The logic further provides an indication on the target device confirming that the low energy mode is engaged (e.g., by activating a light emitting device, such as one or more light emitting diodes (LEDs)) and transmits a signal to the ERMS key which, in response, provides a separate visual indication indicating that the low energy mode is engaged (block 435), and the method 400 ends.

Figure 5:
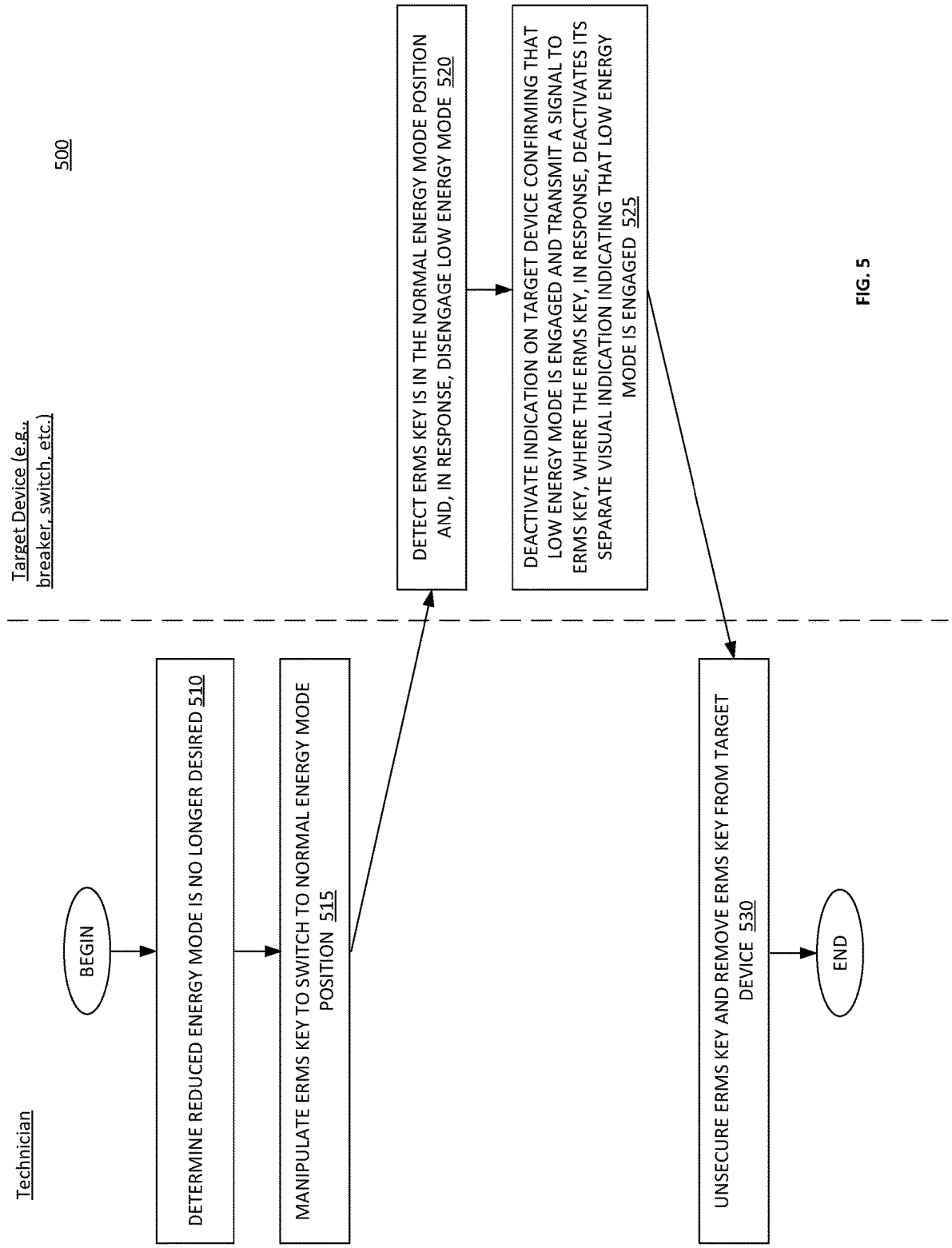
FIG. 5 is a flow diagram illustrating a method for disabling a low energy mode in a target device, according to one embodiment described herein.

FIG. 5 is a flow diagram illustrating a method for disabling a low energy mode in a target device, according to one embodiment described herein. As shown, the method 500 begins at block 510, where a maintenance technician determines that reduced energy mode is no longer desired for a target device. The technician manipulates the ERMS key to switch to a normal energy mode position (block 515). In response, logic in the target device detects the ERMS key is in the normal energy mode position and, in response, disengages the low energy mode of operation for the target device (block 520). Additionally, the logic deactivates an indication on the target device confirming that low energy mode is engaged (e.g., by deactivating a light emitting device providing the indication) and transmits a signal to the ERMS key, indicating the ERMS key should also deactivate its visual indication that low energy mode is active (block 525). The technician unsecures the ERMS key and removes the ERMS key from the target device (block 530), and the method 500 ends.

Figure 6:
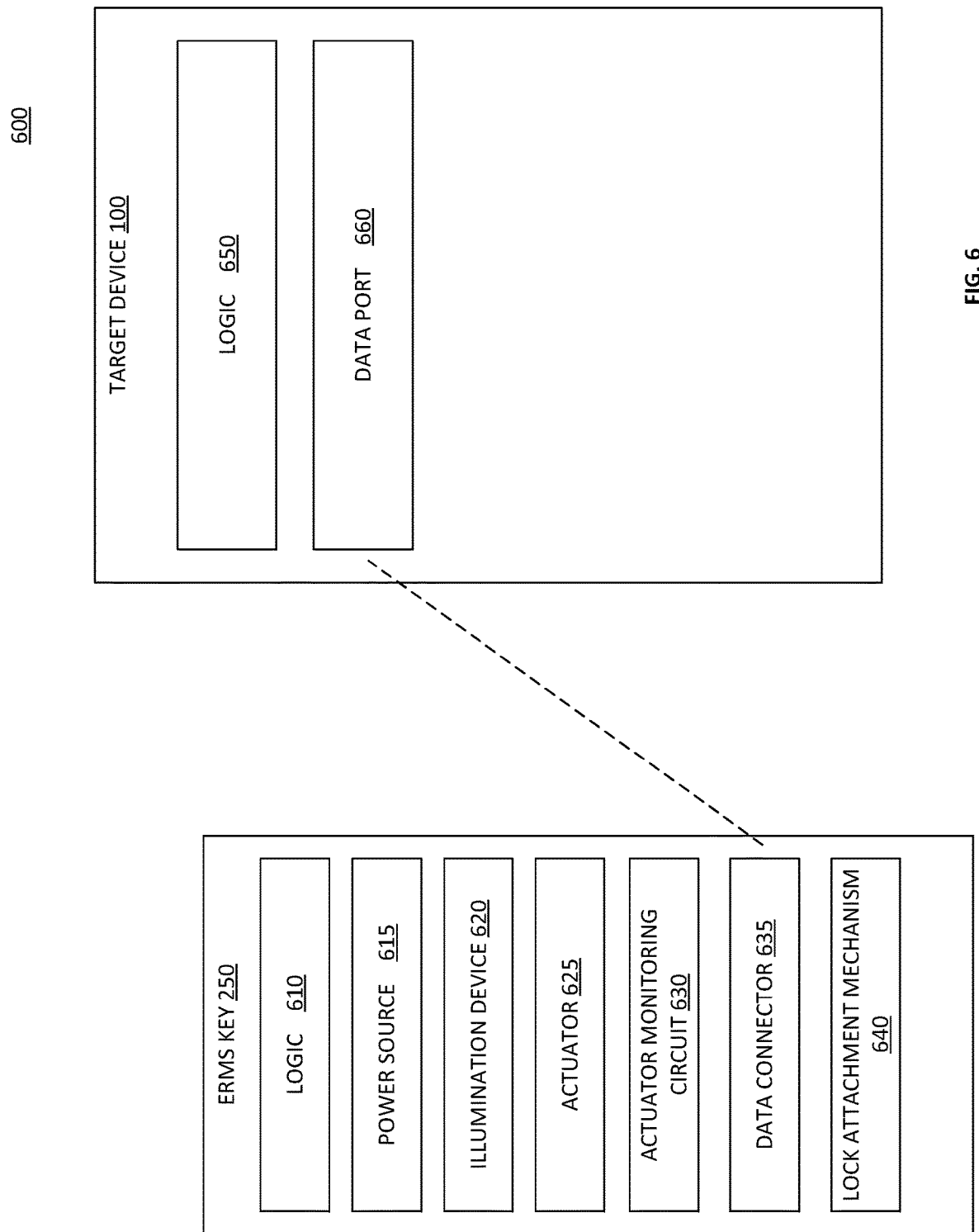
FIG. 6 is a block diagram illustrating a system configured with an ERMS key, according to one embodiment described herein.

FIG. 6 is a block diagram illustrating a system configured with an ERMS key, according to one embodiment described herein. As shown, the system 600 includes ERMS key 250 and target device 100. In the depicted embodiment, the ERMS key 250 includes logic 610, a power source 615, an illumination device 620, an actuator mechanism 625, an actuator monitoring circuit 630, a data connector 635 and a lock attachment mechanism 640. Generally, the power source 615 can be any suitable power source, including a disposable battery and a rechargeable battery. Although the ERMS key 250 in the depicted embodiment has its own power source 615, in one embodiment the ERMS key 250 is configured to receive power over the data connector 635 when the data connector is connected to data port 660 of the target device 100.

The illumination device 620 generally represents one or more devices capable of illuminating when powered by the power source 615. In a particular embodiment, the illumination device 620 represents one or more light-emitting diodes (LEDs). The actuator mechanism 625 is configured to transition between a base positional state and an actuated positional state. For example, a rotary actuator mechanism such as the one shown in FIGS. 2 and 3 could be used, where the actuator mechanism can be rotated between the base positional state and the actuated positional state. For example, when the actuator mechanism 625 is in the base positional state, a user could rotate the actuator mechanism 625 90 degrees In a particular embodiment, the actuator mechanism 625 comprises a spring-based mechanism that is actuated by depressing the actuator mechanism 625. In such an embodiment, each time the spring-based mechanism is actuated by pressing the spring-based mechanism, the spring-based mechanism transitions between the base positional state and the actuated positional state. For example, if the actuator mechanism 625 is in the base positional state and a user depresses the actuator mechanism 625, the actuator mechanism 625 could transition to the actuated positional state. If the user were to then depress the actuator mechanism 625 again, the actuator mechanism 625 could transition back to the base positional state. Of course, the present examples are provided for illustrative purposes only, and more generally, any suitable mechanism and/or manner of actuating the suitable mechanism can be used, consistent with the functionality described herein.

The actuator monitoring circuit 630 is generally configured to monitor the actuator mechanism 625 and more specifically to determine when the actuator mechanism 625 transitions between the base positional state and the actuated positional state. For example, the actuator monitoring circuit 630 could include one or more electrical contacts positioned such that the one or more electrical contacts close when the actuator mechanism 625 is in the actuated positional state.

The data connector 635 generally any suitable connector for inserting into and communicatively coupling with the data port 660 of the target device 100. The data connector 635 could generally be one of any number of different types of connectors, known and unknown, including a multi-pole (e.g., 7 pole) round data connector, a Universal Serial Bus (USB) data connector, and so on. Of course, the present examples are provided for illustrative purposes only, and more generally, any suitable mechanism and/or manner of actuating the suitable mechanism can be used, consistent with the functionality described herein.

The lock attachment mechanism 640 generally represents a mechanism through which a locking mechanism (e.g., a padlock) can be placed in order to restrict the actuation of the actuator 625. One example of the lock attachment mechanism 640 can be seen in FIGS. 2 and 3, where the two plates having respective holes align when the actuator mechanism 625 is rotated into the actuated position (shown in FIG. 3). A locking mechanism can then be passed through the aligned holes, affixing the actuator 625 in place. This allows the ERMS key 250 to support Logout/Tagout practices and procedures, as required by OSHA, other regulating bodies and general best practices.

The logic 610 generally represents computer logic (e.g., executing on a processor or microprocessor within the ERMS key 250, not shown) that performs control operations for the ERMS key 250. For example, in one embodiment, the logic 610 can monitor the actuator monitoring circuit 630 to detect when the actuator mechanism 625 moves between the base positional state and the actuated positional state. Upon detecting the actuator mechanism has moved from the base positional state to the actuated positional state, the logic could generate and transmit a first data message to the target device 100 through the data connector 635 instructing the target device 100 to enter a protected mode (e.g., a lower arcing energy mode).

In the depicted embodiment, the target device 100 includes logic 650 and data port 660. The logic 650 generally represents control logic for the target device 100. Upon receiving the first data message through the data port 660, the logic 650 could perform an operation to place the trip unit in the protected mode. Generally, the specifics of this operation can vary greatly across different target devices 100. It is contemplated that any suitable operation for transition a target device 100 from a normal operating state (or other operating state) to a protected operating state can be used, consistent with the functionality described herein. The logic 650 could confirm that the target device 100 successfully performed the operation and is now operating in the protected mode and, in response, could generate and transmit through the data port 660 a second data message acknowledging that the target device 100 is successfully operating in the protected mode.

The logic 610 could receive the second data message over the data connector 635 and upon receiving the second data message acknowledging that the target device has successfully entered the protected mode, the logic 610 could perform an operation to cause the illumination device 620 to illuminate. Doing so provides a visual indication indicating to a user(s) that the target device 100 is operating in the protected mode.

At some later point in time, the logic 610 could determine from the actuator monitoring circuit 630 that the actuator mechanism 625 has moved from the actuated positional state to the base positional state. In response to this determination, the logic 610 could generate and transmit a third data message to the target device 100 through the data connector 635, instructing the target device 100 to exit the protected mode.

The logic 650 could receive the third data message over the data port 660 and could perform an operation to return the target device 100 to a normal operating mode. Generally, the specifics of such an operation can vary greatly across different target devices 100. It is contemplated that any suitable operation for transition a target device 100 from the protected operating state to a normal operating state (or other operating state) can be used, consistent with the functionality described herein. Upon confirming that the operation was successfully performed and the target device 100 is operating in the normal operating mode, the logic 650 could generate and transmit over the data port 660 a fourth data message acknowledging that the target device 100 has successfully exited the protected mode and is now operating in the normal operating mode.

The logic 610 could receive the fourth data message from the target device 100 over the data connector 635 acknowledging that the target device 100 has successfully exited the protected mode. In response, the logic 610 could perform an operation causing the illumination device 620 to deactivate.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. An Energy Reduction Maintenance Setting (ERMS) key, comprising:
    a portable user device including:
        a data connector configured to communicatively couple to a data port of a target device;
        an illumination device for providing a visual indication to users;
        an actuator mechanism having a base positional state and, when actuated, an actuated positional state;
        actuator monitoring logic configured to perform an operation comprising:
            upon detecting the actuator mechanism has moved from the base positional state to the actuated positional state, generating and transmitting a first data message to the target device through the data connector instructing the target device to enter a protected mode; and
            upon receiving a second data message from the target device over the data connector acknowledging that the target device has successfully entered the protected mode, causing the illumination device to illuminate and provide the visual indication; and
        a power source for supplying power to the illumination device and actuator monitoring logic,
            wherein the data connector, the illumination device, the actuator mechanism, the actuator monitoring logic and the power source are integrated into the portable user device, and
            wherein the data connector of the portable user device is configured to be physically connectable to or disconnectable from the data port of the target device in order to connect or disconnect the portable user device to or from the target device, respectively.

2. The ERMS key of claim 1, wherein the actuator mechanism comprises a rotary device and wherein actuating the actuator mechanism comprises rotating the actuator mechanism from the base positional state to the actuated positional state.

3. The ERMS key of claim 1, wherein the actuator mechanism comprises a spring-based mechanism that, each time the spring-based mechanism is actuated by pressing the spring-based mechanism, the spring-based mechanism transitions between the base positional state and the actuated positional state.

4. The ERMS key of claim 1, wherein the illumination device comprises a light-emitting diode.

5. The ERMS key of claim 1, wherein the portable user device further comprises one or more electrical contacts positioned such that the one or more electrical contacts close when the actuator mechanism is in the actuated positional state, and wherein detecting the actuator mechanism has moved from the base positional state to the actuated positional state is performed based on a determination that the one or more electrical contacts have closed.

6. The ERMS key of claim 1, wherein the operation further comprises:
    upon detecting the actuator mechanism has moved from the actuated positional state to the base positional state, generating and transmitting a third data message to the target device through the data connector instructing the target device to exit the protected mode; and
    upon receiving a fourth data message from the target device over the data connector acknowledging that the target device has successfully exited the protected mode, causing the illumination device to deactivate.

7. A method, comprising:
    upon detecting an actuator mechanism of an Energy Reduction Maintenance Setting (ERMS) key has moved from a base positional state to an actuated positional state, generating and transmitting a first data message to a target device, through a data connector of the ERMS key, instructing the target device to enter a protected mode, the ERMS key being a portable user device; and upon receiving a second data message from the target device over the data connector acknowledging that the target device has successfully entered the protected mode, causing an illumination device of the ERMS key to illuminate, wherein the data connector, the illumination device, the actuator mechanism, an actuator monitoring logic and a power source are integrated into the ERMS key, the method further comprising:

physically connecting or disconnecting the data connector of the ERMS key to or from a data port of the target device in order to connect or disconnect the ERMS key to or from the target device, respectively.

8. The method of claim 7, wherein the actuator mechanism comprises a rotary device and wherein actuating the actuator mechanism comprises rotating the actuator mechanism from the base positional state to the actuated positional state.

9. The method of claim 7, wherein the actuator mechanism comprises a spring-based mechanism that, each time the spring-based mechanism is actuated by pressing the spring-based mechanism, the spring-based mechanism transitions between the base positional state and the actuated positional state.

10. The method of claim 7, wherein the illumination device comprises a light-emitting diode.

11. The method of claim 7, wherein the ERMS key further comprises one or more electrical contacts positioned such that the one or more electrical contacts close when the actuator mechanism is in the actuated positional state, and wherein detecting the actuator mechanism has moved from the base positional state to the actuated positional state is performed based on a determination that the one or more electrical contacts have closed.

12. The method of claim 7, further comprising:

upon detecting the actuator mechanism has moved from the actuated positional state to the base positional state, generating and transmitting a third data message to the target device through the data connector instructing the target device to exit the protected mode; and upon receiving a fourth data message from the target device over the data connector acknowledging that the target device has successfully exited the protected mode, causing the illumination device to deactivate.

13. A trip unit or protective relay, for use with an overcurrent protective device, comprising:

a data port configured to accept a data connector of an Energy Reduction Maintenance Setting (ERMS) key, the ERMS key being a portable user device; and computer logic configured to perform an operation, comprising:

receiving a first data message from the ERMS key currently connected to the data port, the first data message instructing the trip unit to enter a protected mode;

performing an operation to place the trip unit in the protected mode; and upon confirming that the trip unit is operating in the protected mode, generating and transmitting a second data message to the ERMS key acknowledging that the trip unit is successfully operating in the protected mode, wherein the data connector, an illumination device, an actuator mechanism, an actuator monitoring logic and a power source are integrated into the ERMS key, and wherein the data connector of the ERMS key is configured to be physically connectable to or disconnectable from the data port of the trip unit in order to connect or disconnect the ERMS key to or from the trip unit, respectively.

14. The trip unit of claim 13, the operation further comprising:

receiving a third data message from the ERMS key currently connected to the data port, the third data message instructing the trip unit to exit the protected mode;

performing an operation to return the trip unit to a normal operating mode; and upon confirming that the trip unit is operating in the normal operating mode, generating and transmitting a fourth data message to the ERMS key acknowledging that the trip unit is successfully operating in the normal operating mode.

15. The trip unit of claim 14, wherein the ERMS key further comprises a rotary actuator mechanism whereby the rotary actuator mechanism can be rotated between a base positional state to and an actuated positional state, wherein logic within the ERMS key is configured to generate and transmit the first data message responsive to determining that the rotary actuator message has been rotated from the base positional state to the actuated positional state, and wherein the logic within the ERMS key is configured to generate and transmit the third data message responsive to determining that the rotary actuator message has been rotated from the actuated positional state to the base positional state.

16. The trip unit of claim 13, wherein the ERMS key further comprises an illumination device for providing a visual indication to users, and wherein logic within the ERMS key is configured to, upon receiving the second data message from the target device acknowledging that the trip unit has successfully entered the protected mode, cause the illumination device to illuminate and provide the visual indication.

17. The trip unit of claim 16, wherein the ERMS key further comprises one or more electrical contacts positioned such that the one or more electrical contacts close when the rotary actuator mechanism is in the actuated positional state, and wherein logic within the ERMS key is configured to detect that the rotary actuator mechanism has moved from the base positional state to the actuated positional state based on a determination that the one or more electrical contacts have closed.

* * * * *